United States Patent [19]
Overton

[11] 3,841,483
[45] Oct. 15, 1974

[54] WATER PURIFICATION SYSTEM

[75] Inventor: Clifton E. Overton, Northridge, Calif.

[73] Assignee: Overton Engineering, Billings, Mont.

[22] Filed: July 23, 1973

[21] Appl. No.: 381,674

[52] U.S. Cl.................... 210/87, 210/96, 210/243, 210/335
[51] Int. Cl............................................ B01d 35/06
[58] Field of Search............ 210/42, 50, 64, 87, 96, 210/243, 335

[56] References Cited
UNITED STATES PATENTS

| | | | |
|---|---|---|---|
| 3,336,220 | 8/1967 | Neiml | 210/243 X |
| 3,523,891 | 8/1970 | Mehl | 210/96 X |
| 3,664,951 | 5/1972 | Armstrong | 210/96 X |

FOREIGN PATENTS OR APPLICATIONS

| | | | |
|---|---|---|---|
| 1,154,074 | 9/1963 | Germany | 210/243 |

*Primary Examiner*—John Adee
*Attorney, Agent, or Firm*—LeBlanc & Shur

[57] ABSTRACT

A high capacity, flow-through water purification system is described. The system includes one or more chamber units which may be used individually, or arranged in parallel, depending on the volume of water to be purified. The chamber houses first, second and third serially arranged modules. Each module comprises oppositely charged, spaced plates for activating colloidal impurities dispersed in water for subsequent coagulation and removal thereof. Sensors are provided at the chamber inlet and at the chamber outlet for measuring, respectively, conductivity and resistivity. A closed loop proportionate control system is provided for monitoring conductivity and resistivity and for selectively opening and closing inlet and outlet valves to retain a predetermined ratio therebetween for a given power input to the ionizing plates. The power system for the chamber is capable of applying typically up to about 200 volts and from about 2 to about 6 amps direct current to the plates spaced about one inch apart from an input power supply of 110 or 220 volts alternating current. A typical chamber may have overall dimensions of four feet in height and twelve inches in diameter with a four or six inch orifice although larger or smaller units may be constructed. This chamber unit has been found to be capable of purifying a flow rate of at least 1,000 gallons per minute polluted water.

15 Claims, 5 Drawing Figures

WATER PURIFICATION SYSTEM

This invention relates to a water purification system, and specifically to an electrical device for facilitating the separation of the colloidal impurities from polluted water. The principal application for this invention may be found in purifying raw sewage. However, the invention is also applicable to purifying brackish well water, swimming pools, streams, rivers, ponds, lakes and the like, and to hydromining wherein the contaminants in ancient seawater are retained and the liquid discarded.

Clear water is composed of predominantly covalent molecules in which an oxygen atom shares a pair of electrons with each of two hydrogen atoms to thereby form polar molecules. As is also well known, clear water is a nonconductor of electricity. With ionic compounds in solution, however, water is a conductor.

When a solid is placed in contact with water and allowed to disintegrate it forms minute particles which uniformly disperse throughout the liquid. The small insoluble particles in the dispersed phase are larger than molecules, but small enough to remain suspended in the dispersed medium. These particles are also surrounded by molecules of the polar liquid. Although the colloidal particles are much larger than molecules, they are smaller in size tham, for example, a sand and water dispersion, and are too small for economic filtering by conventional means.

The contaminants in water which are not readily filtered by conventional means are principally colloidal particles dispersed therein. In addition, metal complex ions and micro-organisms may also be present. Colloidal particles, because of their small size, are electrically charged, either through a surface absorption of ions, ionization of the particles, or both. These particles have a concentrated layer of relatively stationary charges and a diffused outer layer, oppositely charged, with minute amounts of ion migration continually in progress. The charge in the diffused outer layer weakens with the distance from the particle until a zone of electro-neutrality, marking the layer's outer limit, is reached.

The drop in potential between the inner layer of absorbed ions and the outer limit or isoelectric zone is known as zeta potential. This potential is either positive or negative and is measured in millivolts. Zeta potential is direction proportional to electrophoretic mobility, and is modified by the kind and number of ions present.

While colloids in water are nearly always negatively charged and therefore resist coagulation, when the zeta potential is dropped toward zero, repulsive ionic forces are reduced and the particles tend to clump together.

A reduction in zeta potential may be achieved when the particles are subjected to bombardment by positive ions. The ions are absorbed thereon neutralizing the charge, and permitting the formation of a visible precipitate or floc. The floc may then be filtered by using any conventional means such as settling tanks, or sand or fibrous filters, and the floc thereby removed may be reinjected into polluted water to act as a seed floc for further purification.

The instant invention then induces positively charged ionization thus causing the electrophoretic action leading to coagulation of the colloid particles. In addition, the device of this invention also subjects the bacteria viruses, spores and other micro-organisms in the water to a direct current having a high ripple factor which effectively destroys these disease forming contaminants.

Prior attempts to induce flocculation of colloidal impurities in contaminated water have met with only limited success. For example, in U.S. Pat. No. 3,664,951 to Armstrong the acidity of contaminated water was adjusted with chemical additives to maintain the desired pH and begin precipitation of the floc. The liquid was then subjected to electrolysis whereby the particle sizes increased until they were sufficiently large to trap bubbles of oxygen and hydrogen being involved. The material then floated to the surface as a foam which could be skimmed and removed therefrom.

In U.S. Pat. No. 3,663,413 to Marmo, sacrificial electrodes were provided in an aeration chamber whereby a low current potential imposed on the electrodes would cause the fluid to hydrolyze and induce flocculation in a sewage medium. These devices and other known apparatii are complex and require extensive maintenance. They therefore have high installation, operation, and maintenance costs.

It has been discovered, however, that when polluted water is subjected to a stagewise treatment by controlled application of electrical energy, as will be subsequently described, the zeta potential may be brought to negative whereby colloids will group and flocculation will occur without the addition of costly additives, and without high maintenance and operation costs.

The device of this invention consists of a chamber containing first, second and third serially arranged modules. One or more chambers may be utilized in parallel if desired, depending upon the volume of water to be purified, or a single chamber of sufficient size may be used alone. Each chamber may be preferably of from 4 feet in length with a 12 inch diameter to about one foot in length with a 2 inch diameter, and capable of purifying up to at least about 1,000 gallons per minute. Each chamber has an inlet at one end and an outlet at an opposite end. In the preferred version of this invention wherein a chamber is four feet in length with a twelve inch diameter, the inlet orifice and the outlet orifice may be either 4 or 6 inches in diameter.

The first module is disposed adjacent the chamber inlet. The module includes a plurality of mutually spaced, oppositely charged plates disposed longitudinally, parallel to the inlet flow. As the flow passes through the first module, between the plates, the electrophoretic action begins creating floc in the micro stages of development. As the liquid leaves the first module it enters a collection area for the second module.

The second module includes two mutually spaced plates disposed perpendicular to the flow through the chamber. Each plate is formed preferably from two oppositely charged semi-circular members disposed in a common lateral plane. At least one of said members in each plate has a plurality of holes therein having central axes parallel to the direction of flow through the chamber so that the flow will pass through the plates. As will be obvious to those skilled in the art, adjacent semi-circular members both lateral and parallel to the direction of flow will be oppositely charged.

As the liquid passes through the second module coagulation begins, and the flow then enters a collection area for the third module. The third module may be composed of a plurality of oppositely charged, mutually spaced plates disposed parallel to the flow, but preferably is constructed in the same manner as the second module wherein a pair of mutually spaced plates constructed from oppositely charged semicircular members are disposed perpendicular to the direction of flow. As also in the second module, at least one member in each plate has a plurality of holes therethrough to permit passage of the flow through the third module.

As the flow enters the third module the floc will have grown to an electrophoretic stage near zero potential, and the third module, in effect satisfies the potential so that when the flow exits the third module, and the chamber outlet, it may be directed to, for example, settling tanks, where the flocculent may be permitted to settle, or may be skimmed from the top to thereby separate the flocculent from the purified water.

Control valves are provided at each chamber inlet and outlet, and a flow-meter is provided also at the chamber inlet.

It has been discovered that when polluted water is subjected to a stage-wise treatment by controlled application of an ionizing electrical potential, as will be subsequently described, the zeta potential of colloidal impurities may be brought to negative whereby the colloids will clump, flocculate, and coagulate without the addition of costly chemical additives.

As will be obvious to those skilled in the art the optimum distance between the charged plates in the modules used to apply this electrical potential will be determined by the quality of the water to be purified. The spacing will be increased with the conductivity of the water, and therefore, with the amount of impurities therein. For most applications, however, a spacing of approximately 1 inch between plates has been found to be sufficient.

The device of this invention may be powered by either a 110 or a 220 volt alternating current power supply which is converted to direct current from application to the plates. With the above plate spacing a voltage of up to around 200 volts with current of from about 2 up to about 6 amps has been found to be sufficient to purify a flow of up to at least 1,000 gallons per minute. The aforementioned results were achieved with a cylindrical chamber having external dimensions of approximately four feet in length and twelve inches in diameter with an inlet and outlet orifice diameter of four or six inches.

Accordingly, it is an object of this invention to provide a compact high volume flow-through water purification system.

It is another object of this invention to provide a water purification system which may be installed at relatively low cost, and which will function efficiently with only a minimum of maintenance.

It is another object of this invention to provide a time floc potential reactor for activating colloidal impurities in water so that said impurities clump together for subsequent separation to purify the water.

It is another object of this invention to provide a small, compact, water purification chamber which may be used individually, or in parallel with other of such units to activate colloidal impurities in polluted water flowing therethrough by subjecting said polluted water to an ionizing potential, stagewise, to flocculate and coagulate said impurities without the use of chemical additives.

It is still another object of this invention to provide a three-stage water purification chamber, each stage having a plurality of oppositely charged, mutually spaced plates wherein as the polluted water flows through said chamber, and through the plates in said stages, colloidal impurities therein flocculate and coagulate under a controlled ionizing potential so that as said flow exits said chamber the impurities therein may be rapidly and economically separated from the water.

It is yet another object of this invention to provide a closed loop, proportionately controlled, electrical, water purification reactor which may include one or more chambers having a series of separately controlled, modules therein, said modules adapted to apply an ionizing potential through mutually spaced, oppositely charged plates, to a flow of polluted water passing therethrough so that the colloidal impurities therein flocculate for subsequent removal.

It is yet another object of this invention to provide a closed loop, proportionately controlled water purification system whereby a flow admitted to a chamber housing three modular stages passes successively through each of said stages at a controlled rate and under a variable ionizing potential at each stage so that the impurities therein flocculate and coagulate for subsequent removal without the addition of chemical additives and the like.

These and other objects will become apparent with reference to the drawings and following description wherein.

Figure 1:
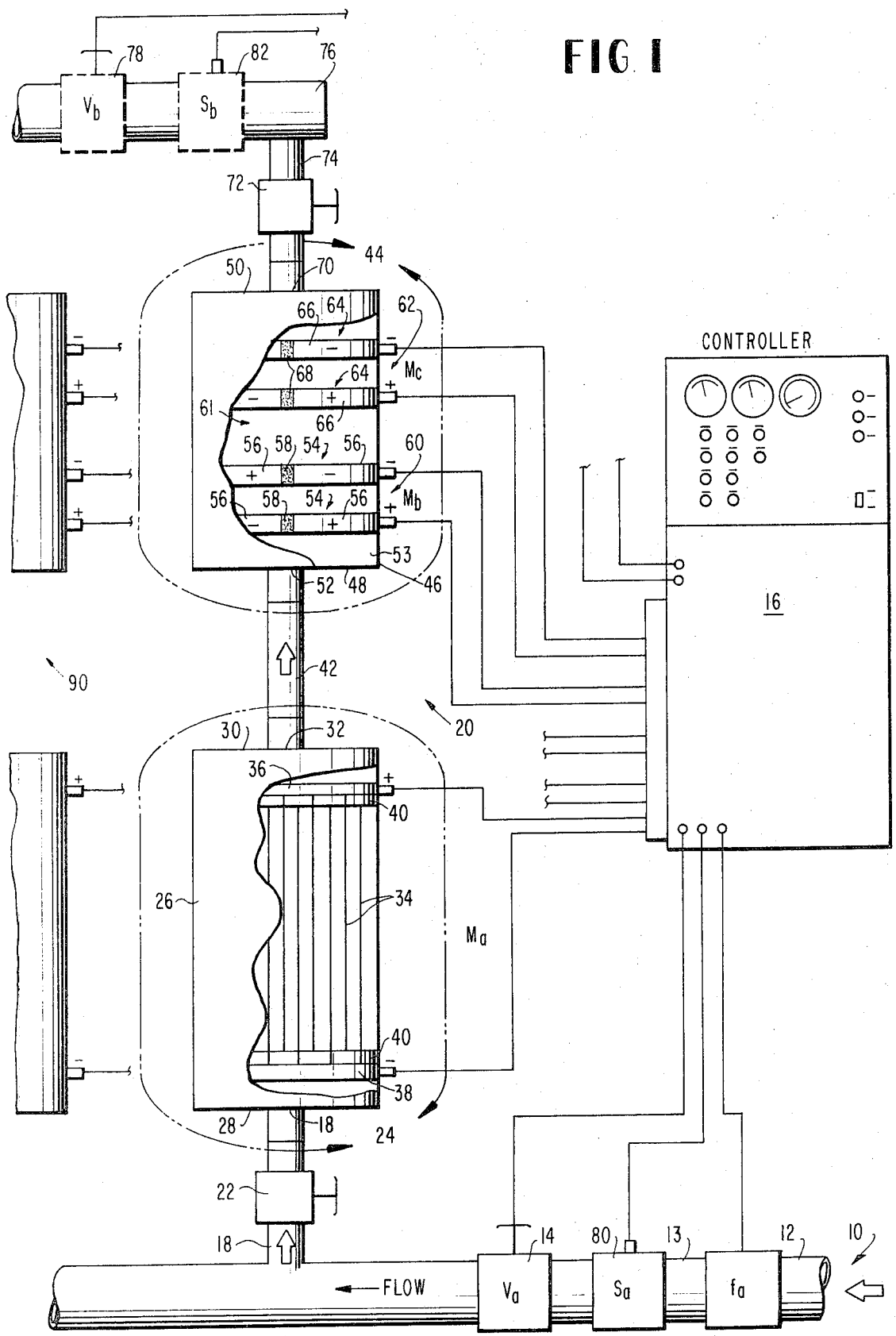
FIG. 1 is a schematic representation of the water purification system of this invention.

With attention to the drawings and to FIG. 1 in particular, the flow of polluted water enters the purification system of this invention at inlet 10 of inlet conduit 13, and passes through a flow-meter 12 and controlled valve 14 disposed therein. The flow-meter 12, also noted on the drawing, as $f_a$, is preferably a magnetic flow-meter. Valve 14, noted as $V_a$ on the drawing, and flow-meter 12 are coupled to proportional controller 16. The flow then enters an inlet 18 for the purification chamber 20 of this invention. An inlet valve 22 may also be provided if desired at inlet 18.

Figure 2:
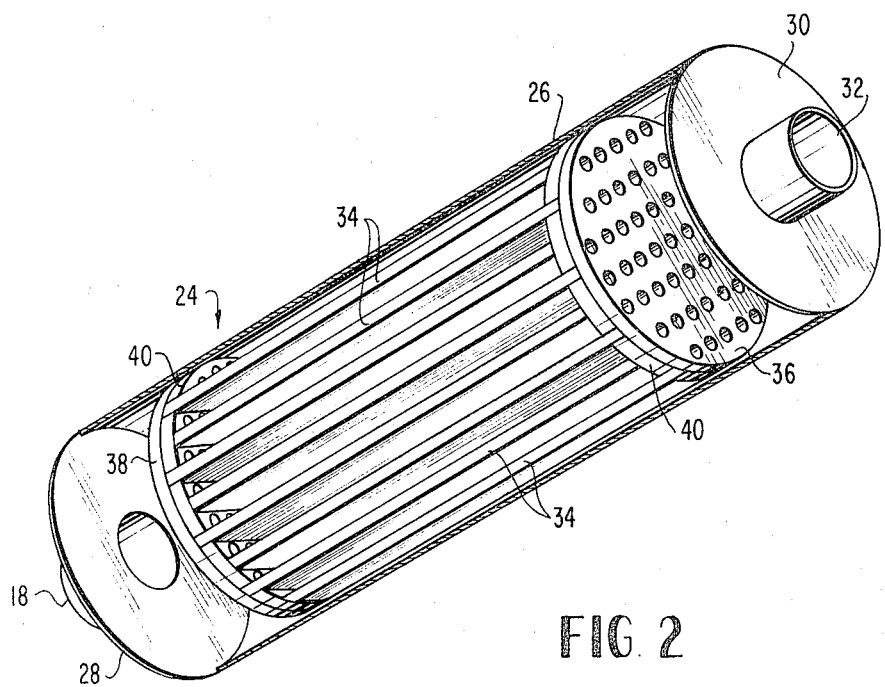
FIG. 2 is a perspective view of an embodiment of the first module of the reactor of this invention.

The first module 24 of reactor chamber 20 is described with reference also to FIG. 2 as follows.

The module 24 comprises a cylindrical housing 26 having a base plate 28 and an upper plate 30. Inlet 18 extends through base plate 28, and an outlet 32 is provided in the upper end plate 30. A plurality of mutually spaced plates 34 are disposed within the housing 26 between end plates 28 and 30. As shown in FIGS. 1 and 2 each of said plates is disposed longitudinally to the direction of flow through module 24. Foraminous end plates 36 and 38 are disposed laterally within the housing 26, and are coupled to a source of direct current from controller 16. Foraminous insulating plates 40 are mounted on the inner surface thereof separating alternate plates 34. Accordingly, a potential applied at plates 36 and 38, generally indicated as $M_a$, will also be applied between adjacent plates 34, and each plate 34 will carry a charge opposite the plates 34 on either side.

As shown in FIG. 1, plates 36 and 38 are also coupled to the electrical controller so that the potential at plates 34 may be monitored by controller 16.

Figure 3:
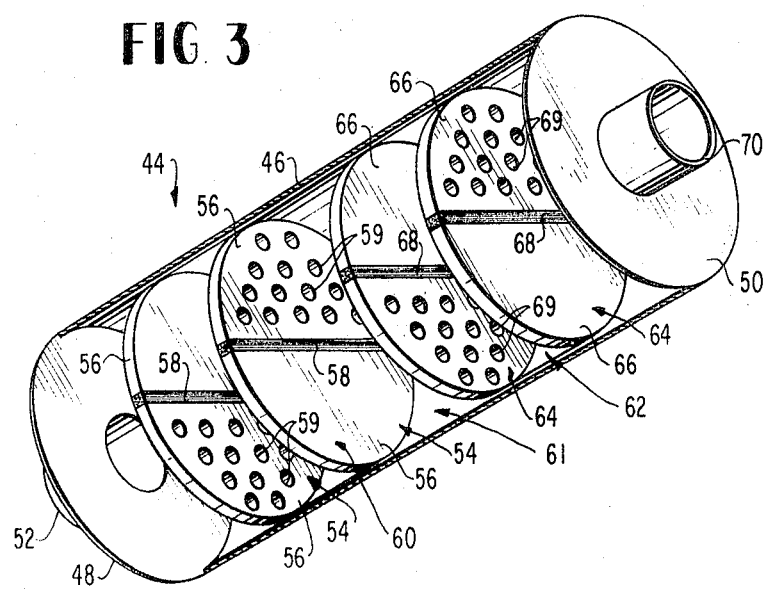
FIG. 3 is a perspective view of the combined second and third modules of the reactor of this invention.

Flow from module 24 through outlet 32 passes through conduit 42 to the second and third modules generally indicated as 44 in FIGS. 1 and 3.

With reference to FIGS. 1 and 3, the second and third stages 60 and 62 are, in this embodiment, enclosed within a single cylindrical housing 46. Housing 46 has a base plate 48 and an upper plate 50. Inlet 52 admits flow from conduit 42 into a receiving chamber 53 within housing 46.

The second module 60 consists of two plates 54 disposed perpendicular to the direction of flow within housing 46. Each plate 54 is made up of two semicircular members 56 separated by an insulating material 58. As shown in FIG. 1, each of said adjacent members 56 is oppositely charged and coupled to a power supply from controller 16. The potential across plates 54 is generally indicated in the drawing as $M_b$.

With reference to FIG. 3 at least one member 56 of each plate 54 is provided with a plurality of holes 59 extending therethrough in the direction of flow to admit the passage of liquid through the second module 60. When the flow passes through the second module 60 it enters the receiving area 61 within housing 46 before passing into the third module 62.

The third module 62 is disposed within housing 46 in a manner similar to the second module 60. The module consists of mutually spaced plates 64 disposed perpendicular to the direction of flow through housing 46. Each plate 64 is constructed from semi-circular members 66 separated by an insulating material 68. At least one member 64 in each plate is provided with a plurality of holes 69 to permit the passage of flow through the third module 62.

As shown in FIG. 1, each of said adjacent semicircular members is oppositely charged, power being applied from the power source in the controller 16 coupled to said plates 64. The potential across plates 64 is generally indicated in the drawings as $M_c$.

Liquid passing through the holes 69 in plates 64 in the third module 62 then exits the combined unit 44 at an outlet 70. A valve 72 may be provided at outlet 70 if desired. Flow from outlet 70 through conduit 74 enters a main outlet conduit 76 having a controlled exit valve 78. Valve 78 is noted on the drawing as $V_b$ and is operably coupled through the controller 16. Flow through conduit 76 then is directed to a conventional separating means such as a settling tank wherein the coagulated impurities are either skimmed or permitted to settle thereby separating pure water from the said impurities.

Sensor 80 is provided in the inlet conduit 13. Sensor 80 is noted on the drawing as $S_a$ and is coupled to the controller 16. Similarly, a sensor 82 is provided in the outlet conduit 76. Sensor 82, noted on the drawing as $S_b$ is also coupled to the controller 16. Sensors 80 and 82 measure conductivity and resistivity, respectively, for comparison in the controller 16, as will be subsequently explained.

As also shown in FIG. 1, one or more additional chambers 90 may be connected in parallel between the inlet flow conduit 13 and the outlet flow conduit 76. However, it will be noted that when a second chamber 19 is so connected, the sensor 82 and the outlet valve 78 will be disposed downstream the connection from the outlet for chamber 90 and the outlet conduit 76.

The chamber of this invention 20 may be contained in a single housing (not shown) having as above noted, external dimensions of 4 feet in height and 12 inches in diameter. In this instance the inlet 18 and the outlet 70 may have diameters of either 4 or 6 inches. However, it should be noted that the device of this invention may be made substantially smaller down to, for example, 1 foot in height and 2 inches in diameter, if desired.

In the preferred embodiment of this invention the spacing between plates 34, 54, and 64 is approximately one inch. As also previously noted the spacing will be slightly greater to accommodate water having higher concentration of impurities. In addition, the potential applied across plates 34, 54, and 64 will be relatively high or up to about 200 volts and a low direct current of between 2 to about 6 amps will be measured.

The following is a general description of the controller 16 used to operate the device of this invention.

The controller 16 for instant system is a closed loop, proportional controller wherein valves $V_a$ and $V_b$ are opened or closed in response to variation in the sensor readings $S_a$ and $S_b$ which measure respectively the conductivity and resistivity of the inlet and outlet flow. When the material reaches the sensor 80 a signal $S_a$ is sent to controller 16 which instantaneously compares this signal with a similar signal $S_b$ from sensor 82. If the conduction factor measured is too high valve 14 will close in response to a signal $V_a$. However, if the factors meet the preselected requirements and the ratios are correct, the valve $V_a$ will open allowing the flow to continue.

Sensor 82 will sense the resistivity $S_b$ in relation to the incoming and outgoing flow. If the resistivity is too low valves 14 and 78 will close responsive to signals $V_a$ and $V_b$ from controller 16. Highly conductive solutions such as sea water are allowed to flow through chamber 20 only after the reset function of the controller has verified the power requirements and the proper ratio is maintained.

Figure 4:
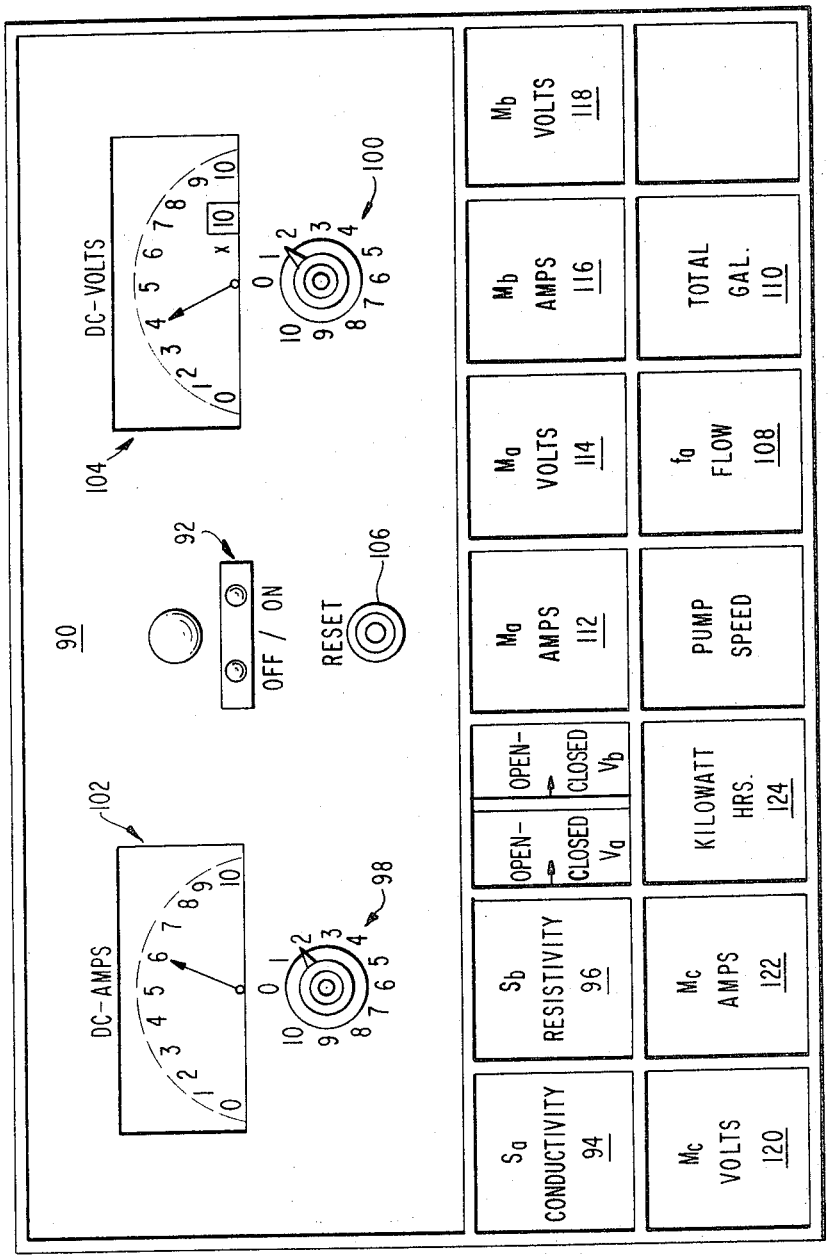
FIG. 4 is a schematic representation of the control panel of the proportional controller for the device of this invention.

With reference to FIGS. 1 and 4 the device of this invention is operated as follows.

The master control panel 90 for the controller 16 is shown in FIG. 4. Referring thereto, initially, the system switch 92 is turned on and the material to be treated allowed to flow through chamber 20 for a short period of time of, for example, 10 seconds. During this time conductivity and resistivity are monitored by sensors 80 and 82 producing readings in mhos. and ohms at meters 94 and 96.

The operator then sets the amp set point at switch 98 and the voltage set point at switch 100 on panel 90. A time delay relay (not shown) will start system functioning in, for example, 5 seconds.

Meters 102 and 104 on panel 90 are then monitored. If the amps or volts shown are too high or too low the operator must activate the reset 106 and repeat the procedure.

When the voltage and amperage are correct, the system will operate in the following sequence: Valve 14 will open to allow flow of the material to be treated into the first module 24 of chamber 20 at a constant rate. The flow rate will be measured by flow meter 12 and displayed at recorder 108, and the total gallons will also be recorded at 110.

When the material enters module 24 ionization begins and continues through the module with amps and volts $M_a$ being recorded at 112 and 114. The potential applied at module 24 creates a microfloc which is visible and continues to grow as the material enters the receiving area 53 for the second module 60.

In the second module 60 a slightly higher potential charge due to predetermined spacing of plates 54 may be applied if it is desired to speed ionization. Preferably at least six holes 59 are provided in opposite semi-circular members 56. The amps and volts $M_b$ at the second module 60 are recorded at recorders 116 and 118, respectively.

Coagulation begins in the second module through ion exchange. The ionic flocculent, made up of colloidal particles from algae, bacteria, inorganic and organic matter, is modified and the electrophoretic character of the water is changed. The second module 60 may also act as a security chamber. The design of this module causes the flow to pass through a specific current which may have a high ripple factor to destroy bacteria, viruses, and spores.

The flow then enters the third module 62 which may be constructed similar to the second module 60. The third module 62, the satisfier, brings the zeta potential of the colloidal particles to negative thereby causing the colloids to clump together. The potential applied in module 62 at plates 64, $M_c$, is recorded by 120 and at the current at 122. A separate meter 124 also records the kilowatt hours utilized in the system of this invention. The material then exits chamber 20 passing through sensor 82 and valve 78 to a conventional settling tank or other separating means (not shown).

By monitoring the flow rate, conductivity of the flow into the system and resistivity of the flow out of the system, variations caused by surges and concentration changes may be compensated for through controller 16 by opening or closing valves 14 and 78 in the conventional manner.

As will be obvious to those skilled in the art the plates 34 may be constructed of any of a variety of well known metals such as iron, aluminum, copper, bismuth and carbon or any combination of various alloys. The plates 54 and 64 may similarly be constructed of, for example, iron or aluminum semi-circular disc members or of any of a variety of well known alloys.

Figure 5:
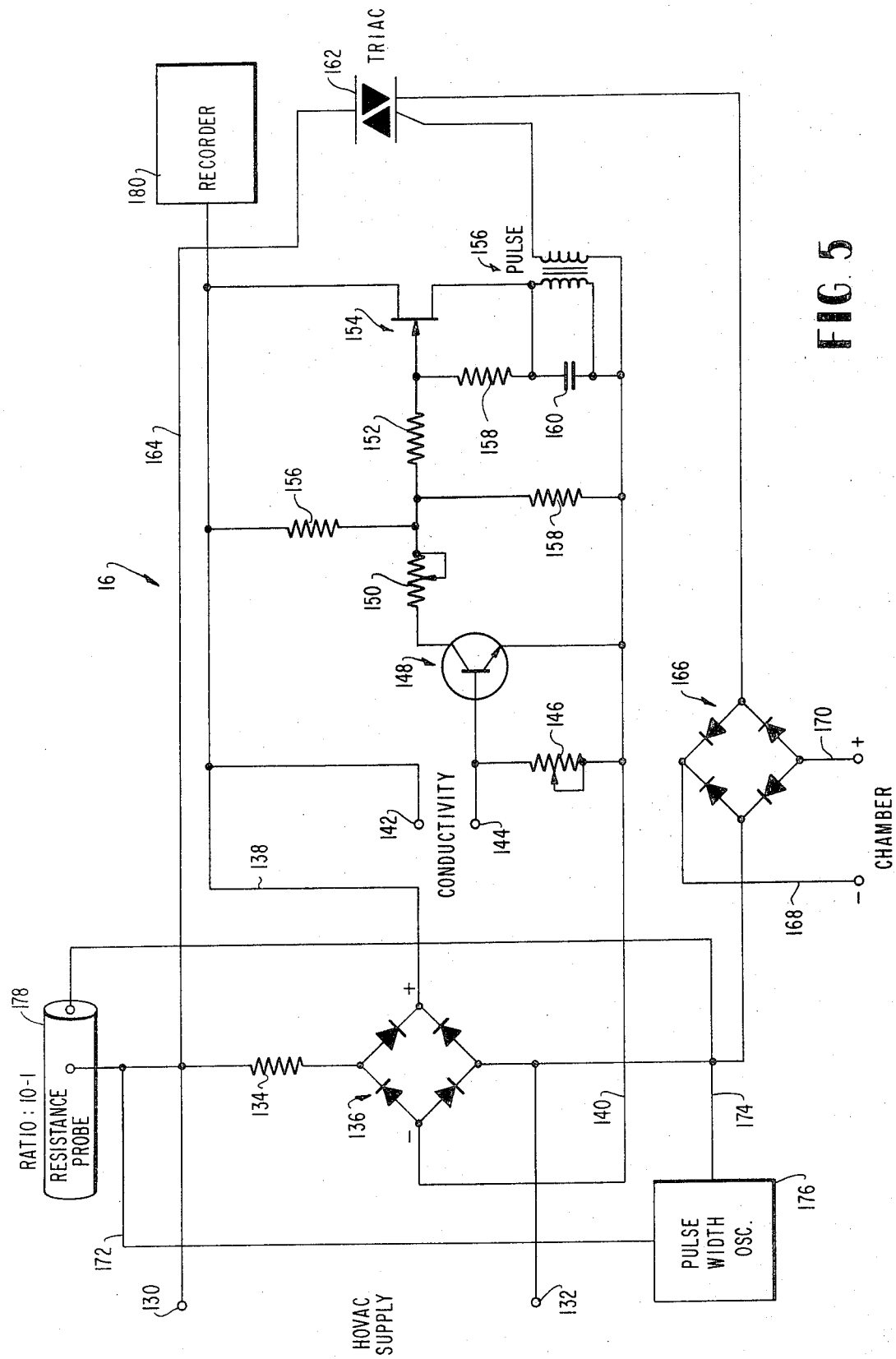
FIG. 5 is a schematic representation of the electrical controller circuit for the system of this invention.

The following is a description of the electrical circuit for the controller 16, as shown in FIG. 5;

The controller comprises a pair of input terminals 132 adapted to receive 110 volts AC from a conventional power supply outlet. The 110 volt AC potential is applied through a current limiting resistor 134 to a full wave rectifying bridge 136 which produces a DC output across leads 138 and 140. Connected across these leads are the terminals 142 and 144 forming the conductivity sensor 80 of FIG. 1 and between which the conductivity of the incoming fluid is detected. These terminals are in series with an adjustable resistor 146.

Resistor 146 has its upper rim connected to the base of an NPN junction transistor 148 and the collector of this transistor is connected through a variable adjustment resistor 150 and a series resistor 152 to the gate of a junction field effect transistor 154. A resistance divider connected through resistor 152 to the gate of the FET is formed by resistors 156 and 158. The source-drain circuit FET 154 is connected across the DC leads 138 and 140 in series with the primary winding of a pulse transformer 156. Connected to this primary is an RC circuit formed by resistor 158 and capacitor 160.

The secondary of the pulse transformer is connected to the control input of a triac 162. The triac 162 is connected across the power supply terminals 130 and 132 by way of a lead 164 and through a second full wave rectifier bridge 166. The output terminals of bridge 166 provide a DC potential to the selected one of the chambers illustrated in FIG. 1 by way of leads 168 and 170 under the control of triac 162. While only a single chamber connection is illustrated in FIG. 5, it is understood that the other connections are identical to the one illustrated.

Also connected across the power supply terminals 130 and 132 by way of leads 172 and 174 is a pulse width oscillator 176 which by way of example only may be a conventional relaxation oscillator producing a series of positive output pulses, the width of which is variable in accordance with the resistance of a resistance probe 178 forming the resistance sensor 82 of FIG. 1. Finally, connected to the output of rectifier bridge 136 is a recorder 180 which monitors the bridge output.

In operation the 110 volt AC power supply is full wave rectified in bridge 132 and this rectified DC output is applied across terminals 142 and 144 of sensor 80 connected to the base of transistor 148. The conductivity of the incoming fluid determines the out conduction of transistor 148 and this in turn varies the pulses produced by FET 154 and its associated RC circuit through the primary pulse transformer 156. These pulses act as firing pulses for the triac 162 to vary the AC power flow through the triac in a well known manner. The power of controlled AC through triac 162 is full wave rectified in the second bridge 166 to produce a power controlled DC output on leads 168 and 170 to the respective chambers of FIG. 1.

The variable pulse width oscillator 176 produces positive pulse signals having a pulse width which is varied in accordance with the resistance of the fluid sensed by probe 178. These variable width pulses are superimposed upon the AC supply and rectified by bridge 136 so that the DC signal applied to the circuit FET 154 is dependant not only on the conductivity of the fluid between terminals 142 and 144, but also on the resistivity of the fluid sensed by probe 178. The circuit is constructed so that the DC power in output leads 168 and 170 decreases when the resistance of the exiting fluid increases indicating greater purity and conversely the power is increased when a drop in resistance shows less purity for the exiting fluid. An increase in conductivity between terminals 142 and 144 produces an increased power output on leads 168 and 170 to compensate for the greater impurity of the incoming fluid whereas a drop in conductivity between terminals 142 and 144 is accompanied by a power drop at the DC output leads 168 and 170.

In conclusion, the device of this invention is a flow-through water purification apparatus capable of delivering a high volume of at least 1,000 gallons of purified water per minute. A multiplex of the units of this invention are capable of delivering millions of gallons per day, purified water. The device of this invention may be installed, operated and maintained at low cost, and may be powered by either 110 or 220 volts alternating current. While the dimensions of the chamber of this invention may be designed to fit a particular application, it has been discovered that a chamber as described above approximately 1 foot in length and 2 inches in diameter is capable of purifying 500 gallons per day, and in order to deliver a high volume of approximately 1,000 gallons per minute, the chamber should be increased in size to about 4 feet in length and 12 inches in diameter.

The chamber of this invention consists of three separately controlled modules, controlled with a master controller to regulate the flow therethrough in relation to the predetermined potential across a plurality of oppositely charged plates spaced a predetermined distance apart in each module.

While in the preferred embodiment the plates of the first module are disposed longitudinally to the direction of flow, as will be obvious to those skilled in the art, the plates may be disposed at any angle to the direction of flow if it is desired to slow the flow through the module. The second module is comprised of two plates disposed perpendicular to the direction of flow having a plurality of holes therein to permit passage of the flow therethrough.

The third module as described is constructed similarly to the second module, although, in the alternative, it may be, if desired, constructed similarly to the first module. The residence time in the third module necessary to produce the desired purity, or floc growth, may be controlled by opening and closing the exit valve in response to the resitivity measured at the exit conduit from the chamber.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A flow-through water purification apparatus for separating colloidal particles suspended therein comprising:

a body having an inlet at one end and an outlet at an opposite end, said body defining at least one passage therethrough between the inlet and the outlet so that a flow of water entering the inlet will pass through said body exiting therefrom at the outlet;

a first set of mutually spaced plates disposed in the passage through said body adjacent said inlet;

a second set of mutually spaced plates disposed in the passage to said body intermediate said first set and the outlet;

a third set of mutually spaced plates disposed in the passage through said body adjacent said outlet and downstream said second set of plates;

means carried by said apparatus for directing a flow of water to be purified through the inlet, into the passage and sequentially through the plates in said first, second and third sets, and subsequently through the outlet;

means coupled to each of said plates for applying a preselected electrical potential thereacross so that when said flow is directed through said plates the colloidal particles therein will be subjected to a predetermined ionizing potential;

first valve means at the inlet for controlling the flow admitted thereto;

second valve means at the outlet for controlling the flow exiting therethrough;

first sensor means at the inlet for producing a signal proportional to the conductivity of the flow passing therethrough;

second sensor means at the outlet for producing a signal proportional to the resistivity of the flow therethrough;

means coupled to both of said valve and sensor means for selectively opening and closing said valve means responsive to predetermined signals from said sensors.

2. The apparatus of claim 1 further comprising recording and display means coupled to said sensor means and said means for applying an electrical potential at said plates for recording and displaying the conductivity and resistivity of said flow and the electrical characteristics of the potential applied to said plates.

3. The apparatus of claim 2 wherein each of said sets of plates comprises a plurality of mutually spaced metal plate members disposed in said passage at an angle to the direction of flow therethrough.

4. The apparatus of claim 3 wherein said first set of plates further comprises a plurality of equidistantly spaced, oppositely charged elongated plates, the longitudinal axis of each of said plates disposed parallel to the direction of flow through said passage.

5. The apparatus of claim 4 wherein said second set of plates comprises a pair of flat plates, each of said plates being disposed in said passage perpendicular to the direction of flow therethrough, each of said plates having a plurality of holes therethrough extending parallel to the direction of flow through the passage.

6. The apparatus of claim 5 wherein each of said plates comprises a first and a second segment having an insulator therebetween, each of said segments in each plate carrying an opposite charge, and each segment in one plate carrying a charge opposite the charge carried by the corresponding segment in said adjacent plate, at least one segment of each plate having a plurality of holes therethrough.

7. The apparatus of claim 5 wherein said third set of plates comprises a pair of flat plates, each of said plates being disposed in said passage perpendicular to the direction of flow therethrough, each of said plates having a plurality of holes therethrough extending parallel to the direction of flow through the passage.

8. The apparatus of claim 7 wherein each of said plates comprises a first and a second segment having an insulator therebetween, each of said segments in each plate carrying an opposite charge and each segment in one plate carrying a charge opposite the charge carried by the corresponding segment in said adjacent plate, at least one segment of each plate having a plurality of holes therethrough.

9. The apparatus of claim 1 wherein said body defines a passage having a generally circular cross section.

10. The apparatus of claim 5 wherein said body defines a passage having a generally circular cross section and said second set of plates comprises a pair of flat circular plates.

11. The apparatus of claim 10 wherein each of said segments in each of said plates is semicircular.

12. The apparatus of claim 7 wherein said body defines a passage having a generally circular cross section and each of said plates in said third set is circular.

13. The apparatus of claim 12 wherein each of said segments in each of said plates is semicircular.

14. The apparatus of claim 1 wherein a direct current potential of up to about 200 volts is applied across said plates.

15. The apparatus of claim 14 wherein said plates are spaced apparoximately 1 inch apart.

* * * * *

UNITED STATES PATENT OFFICE
CERTIFICATE OF CORRECTION

Patent No. 3,841,483                    Dated October 15, 1974

Inventor(s)         Clifton E. Overton

It is certified that error appears in the above-identified patent and that said Letters Patent are hereby corrected as shown below:

In Column 3, line 41, "from" should read --for--.

Signed and sealed this 21st day of January 1975.

(SEAL)
Attest:

McCOY M. GIBSON JR.
Attesting Officer

C. MARSHALL DANN
Commissioner of Patents